United States Patent [19]
Fukushima et al.

[11] Patent Number: 5,799,289
[45] Date of Patent: Aug. 25, 1998

[54] ORDER MANAGEMENT SYSTEM AND METHOD CONSIDERING BUDGET LIMIT

[75] Inventors: Kazuyoshi Fukushima, Tokyo; Koubun Suzuki, Kawasaki, both of Japan

[73] Assignee: Ricoh Company, Ltd., Japan

[21] Appl. No.: 723,115

[22] Filed: Sep. 30, 1996

[30] Foreign Application Priority Data

Oct. 2, 1995 [JP] Japan .................................. 7-276217

[51] Int. Cl.$^6$ .................................................. G06F 17/60
[52] U.S. Cl. ........................... 705/400; 364/400; 705/1; 705/30
[58] Field of Search ................ 235/383; 340/825.3, 340/825.31, 825.34, 825.35; 364/400, 464.1; 395/201, 207, 208, 226, 228, 229, 230; 705/1, 7, 8, 26, 29, 30, 400

[56] References Cited

U.S. PATENT DOCUMENTS

| | | | |
|---|---|---|---|
| 4,107,467 | 8/1978 | Johnson et al. | 379/93.12 |
| 4,197,986 | 4/1980 | Nagata | 235/379 |
| 4,999,806 | 3/1991 | Chernow et al. | 395/712 |
| 5,224,034 | 6/1993 | Katz et al. | 705/7 |
| 5,345,071 | 9/1994 | Dumont | 235/383 |
| 5,644,727 | 7/1997 | Atkins | 705/40 |

FOREIGN PATENT DOCUMENTS

| | | |
|---|---|---|
| 2-144662 | 6/1990 | Japan . |
| 7-210594 | 8/1995 | Japan . |

OTHER PUBLICATIONS

English language abstract of Japanese '662 document.
English language abstract of Japanese '594 document.

*Primary Examiner*—Edward R. Cosimano
*Attorney, Agent, or Firm*—Dickstein Shapiro Morin & Oshinsky LLP

[57] ABSTRACT

An order management system automatically places an order with one of a plurality of suppliers when order information is input by one of a plurality of orderers. A terminal unit is provided to each of the orderers. The terminal unit is used for inputting the order information being transmitted to a central management unit via a communication network. The central management unit manages order history information and section information with respect to each orderer. The central management unit calculates a total cost of previous orderers based on the order history information of one of the orderers sending the order information and order information sent from one of the orderers. Execution of an ordering process is permitted when the calculated total cost of the previous orders is within a budget of the orderer.

22 Claims, 8 Drawing Sheets

| SUPPLIER CODE | ORDER PRIORITY | ORDER LIMIT | ORDERED SUPPLY COST | ORDER PROHIBITION FLAG | PROHIBITION PERIOD | SECTION IN CHARGE | PERSON IN CHARGE | TEL No. | FAX No. |
|---|---|---|---|---|---|---|---|---|---|
| SUPPLIER CODE | ORDER PRIORITY | ORDER LIMIT | ORDERED SUPPLY COST | ORDER PROHIBITION FLAG | PROHIBITION PERIOD | SECTION IN CHARGE | PERSON IN CHARGE | TEL No. | FAX No. |
| ... | ... | ... | ... | ... | ... | ... | ... | ... | ... |
| SUPPLIER CODE | ORDER PRIORITY | ORDER LIMIT | ORDERED SUPPLY COST | ORDER PROHIBITION FLAG | PROHIBITION PERIOD | SECTION IN CHARGE | PERSON IN CHARGE | TEL No. | FAX No. |

| 82a | 82b | 82c | 82d | 82e | 82f | 82g | 82h | 82i |
|---|---|---|---|---|---|---|---|---|
| SECTION CODE | SECTION NAME | EXPENSE CODE | BUDGET | TOTAL COST OF ORDERS | CLIENT ADDRESS | PERSON IN CHARGE | TEL. NO. | FAX No. |
| SECTION CODE | SECTION NAME | EXPENSE CODE | BUDGET | TOTAL COST OF ORDERS | CLIENT ADDRESS | PERSON IN CHARGE | TEL. NO. | FAX No. |
| ... | ... | ... | ... | ... | ... | ... | ... | ... |
| SECTION CODE | SECTION NAME | EXPENSE CODE | BUDGET | TOTAL COST OF ORDERS | CLIENT ADDRESS | PERSON IN CHARGE | TEL. NO. | FAX No. |

| ITEM NAME (83a) | ITEM CODE (83b) | UNIT PRICE (83c) | SUPPLIER CODE (83d) |
|---|---|---|---|
| ITEM NAME | ITEM CODE | UNIT PRICE | SUPPLIER CODE |
| ITEM NAME | ITEM CODE | UNIT PRICE | SUPPLIER CODE |
| ⋮ | ⋮ | ⋮ | ⋮ |
| ITEM NAME | ITEM CODE | UNIT PRICE | SUPPLIER CODE |

| ITEM NAME (84a) | ITEM CODE (84b) | UNIT PRICE (84c) | SUPPLIER CODE (84d) | ORDER PRIORITY (84e) |
|---|---|---|---|---|
| ITEM NAME | ITEM CODE | UNIT PRICE | SUPPLIER CODE | ORDER PRIORITY |
| ITEM NAME | ITEM CODE | UNIT PRICE | SUPPLIER CODE | ORDER PRIORITY |
| ⋮ | ⋮ | ⋮ | ⋮ | ⋮ |
| ITEM NAME | ITEM CODE | UNIT PRICE | SUPPLIER CODE | ORDER PRIORITY |

| SECTION CODE | ORDER DATE | SUPPLIER CODE | ITEM NAME | AMOUNT | COST |
|---|---|---|---|---|---|
| SECTION CODE | ORDER DATE | SUPPLIER CODE | ITEM NAME | AMOUNT | COST |
| ⋮ | ⋮ | ⋮ | ⋮ | ⋮ | ⋮ |
| SECTION CODE | ORDER DATE | SUPPLIER CODE | ITEM NAME | AMOUNT | COST |

ORDER MANAGEMENT SYSTEM AND METHOD CONSIDERING BUDGET LIMIT

BACKGROUND OF THE INVENTION

1. Field of the Invention

The present invention generally relates to an order management system and method and, more particularly, to an order management system and method for automatically placing an order for particular expendable supplies based on order information input from each department or section of a user of the system.

2. Description of the Related Art

When placing an order for expendable supplies or parts such as copy papers or toner cartridge used in an office, a person in charge of managing the order in each department or section of the office may separately issue an order sheet or slip. The order may be placed by telephone or the order sheet or slip may be sent by facsimile or mail. Additionally, in most cases, the management for ordering such expendable supplies or parts, including budget management based on previous orders, relies on human actions.

In the above-mentioned order management procedure, it is difficult to manage the total budget for the entire office since the budget is separately managed by each department or section in the office.

Additionally, such order management has a disadvantage in that the same management function may be duplicatively performed in each department or section, and, thus, time and labor for management of the whole office is wasted. Further, each department or section is required to have the same management information including supplier information, since orders are placed by each department or section.

Additionally, expendable supplies or parts are generally supplied by a plurality of suppliers for maintaining a stable and economical supply. However, it is difficult to totally manage each of the suppliers supplying identical expendable supplies or parts.

SUMMARY OF THE INVENTION

It is a general object of the present invention to provide an order management system and method in which the above-mentioned problems are eliminated.

A more specific object of the present invention is to provide an order management system and method which can unitarily and automatically manage ordering processes based on order information supplied by each department or section.

In order to achieve the above mentioned object, there is provided according to one aspect of the present invention an order management system for automatically placing an order with one of a plurality of suppliers when order information is input by one of a plurality of orderers, the order management system comprising:

a terminal unit provided to each of the orderers, the terminal unit including means for inputting the order information, the order information being transmitted to a communication network; and a central management unit receiving the order information from the terminal unit through the communication network, the central management unit including collection processing means for managing order history information and section information with respect to each orderer, the collection processing means calculating a total cost of previous orders based on the order history information of one of the orderers sending the order information and order information sent from the one of the orderers, the central management unit also including order permission means for permitting an execution of an ordering process when the calculated total of the previously ordered costs is within a budget of the orderer, the budget being included in the section information.

According to the above-mentioned invention, since an ordering process is executed only when the total cost of the previous orders for each of the orderers which may correspond to each department or section in a company, each department or section placing an order can be prevented from exceeding their budget.

The central management unit may further include supplier selecting means for calculating a total cost of previously received order for each of the suppliers based on the order history information and the order information, and for selecting one of the suppliers whose total cost of previously received orders is within an order limit.

Thus, exceeding the order limit previously set to each of the suppliers is prevented.

Additionally, the supplier selecting means may select one of the suppliers based on the order history information so that each of the suppliers equally receives orders.

Further, the supplier selecting means manages supplier information including an order prohibition flag which represents a prohibition of placing an order with a supplier indicated by the order prohibition flag.

Further, the supplier selecting means selects one of the suppliers offering the lowest price when an item to be ordered is supplied by a plurality of suppliers.

The order management system according to the present invention may further comprise ordering means for placing an order through the communication network with the suppliers based on the order information.

Additionally, there is provided according to another aspect of the present invention an order management method for automatically placing an order with one of a plurality of suppliers when order information is input by one of a plurality of orderers, the order management method being performed in an order management system comprising a plurality of terminal units provided to the respective orderers and a central management unit connected to each of the terminal unit, the order management method comprising the steps of:

sending the order information from one of the terminal units to the central management unit;

calculating a total cost of previous orders based on order history information of one of the orderers sending the order information and order information sent from the one of orderers by managing the order history information and section information with respect to each of the orderers; and permitting an execution of an ordering process when the calculated total cost of previous orders is within a budget of the orderer, the budget being included in the section information.

According to the above-mentioned invention, since an ordering process is executed only when the total cost of the previous orders for each of the orderers which may correspond to each department or section in a company, each department or section placing an order is prevented from exceeding their budget.

The method according to the present invention may further comprise the steps of:

calculating a total cost of previously received orders for each of the suppliers based on the order history information and the order information; and selecting one of the suppliers whose calculated total cost of previously received orders is within an order limit.

Thus, exceeding the order limit previously set to each of the suppliers can be prevented.

Additionally, the order management method according to the present invention may further comprise the step of:

selecting the one of the suppliers based on the order history information so that each of the suppliers equally receives orders.

Further, the order management method according to the present invention may further comprise the step of:

prohibiting an order to be placed with a supplier indicated by an order prohibition flag included in supplier information.

Further, the order management method according to the present invention may further comprise the step of:

selecting one of the suppliers offering the lowest price when an item to be ordered is supplied by a plurality of suppliers.

The order management method according to the present invention may further comprise the step of:

automatically placing an order with the suppliers based on the order information through a communication network connecting the central management unit to each of the suppliers.

Additionally, the order management method according to the present invention may be performed by a combination of a general purpose computer and a processor readable medium such as a memory provided in the computer or a CD-ROM which stores program information used by the computer.

Other objects, features and advantages of the present invention will become more apparent from the following detailed description when read in conjunction with the accompanying drawings.

DETAILED DESCRIPTION OF THE PREFERRED EMBEDMENTS

Figure 1:
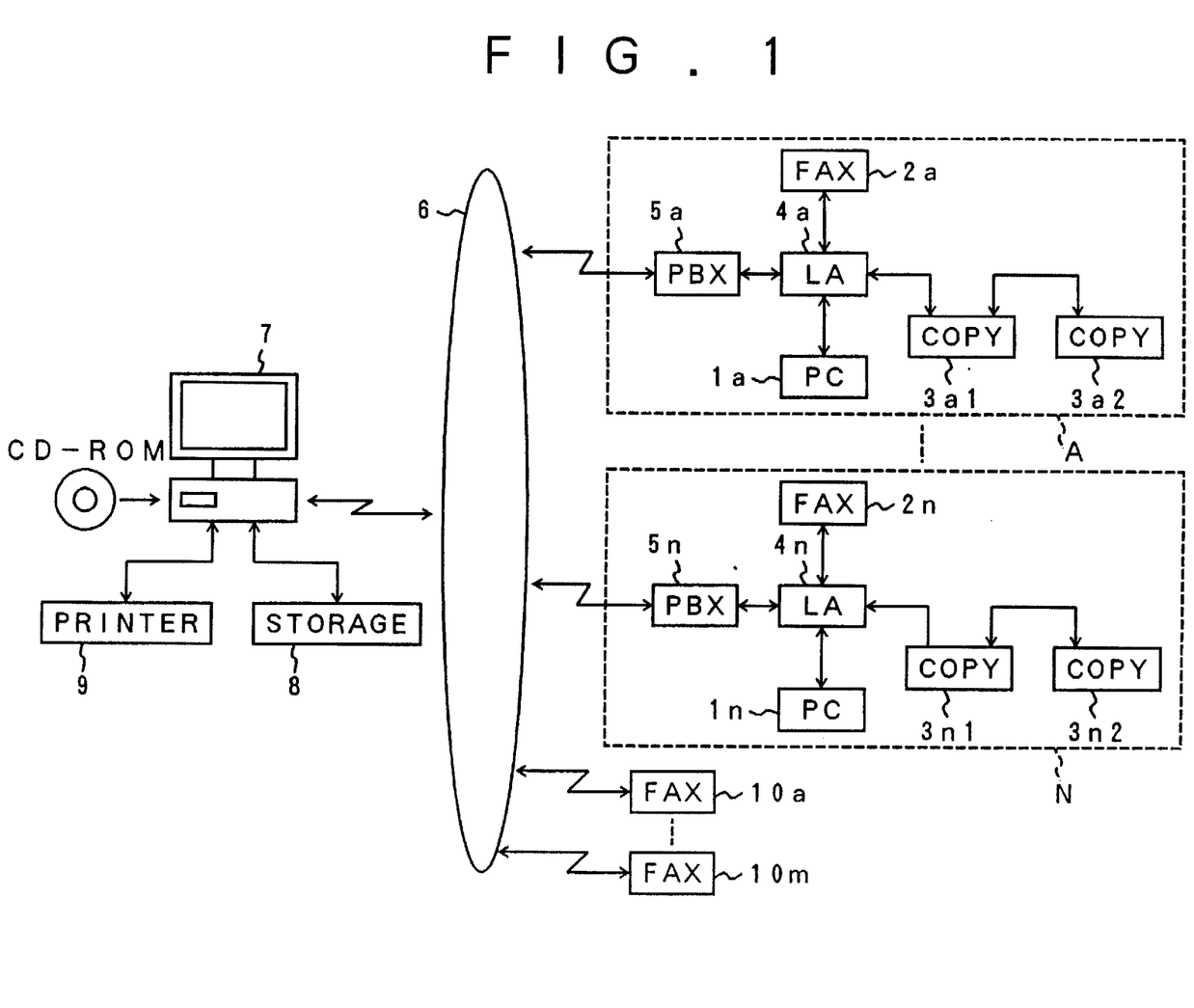
FIG. 1 is a structural diagram of an order management system according to a first embodiment of the present invention.

A description will now be given of a first embodiment according to the present invention. FIG. 1 is a structural diagram of an order management system according to the first embodiment of the present invention. The order management system shown in FIG. 1 is constructed to unitarily manage order processes performed in an entire company having a plurality of departments or sections and branch offices.

As shown in FIG. 1, the order management system according to the first embodiment comprises a central management unit 7 and a plurality of terminal units A to N connected to the central management unit 7 via a public telephone network 6. The central management unit 7 is located, for example, in a management center which unitarily manages order processes which are performed based on information input from each of the terminal units. The terminal units A to N may be located in the respective departments or sections and branch offices. The order management system further includes a plurality of facsimile apparatuses (FAXS) 10a to 10n connected to the public telephone network 6. The facsimile apparatuses 10a to 10n may be located at a supplier's site so as to receive order information transmitted by the central management unit 7.

Each of the terminal units A to N, for example, the terminal unit A, comprises a personal computer (PC) 1a, a facsimile apparatus (FAX) 2a, copy machines 3a1 and 3a2, a line adapter (LA) 4a and a private branch exchange (PBX) 5a. The personal computer 1a, the facsimile apparatus 2a and copy machine 3a1 are connected to the line adapter 4a. The copy machine 3a2 is connected to the copy machine 3a1 so that the copy machine 3a2 is also connected to the line adapter 4a through the copy machine 3a1. The personal computer 1a, the facsimile apparatus 2a and copy machines 3a1 and 3a2 are provided for inputting order information such as, for example, a supplier's name, an item name or number and the number of pieces to be ordered. The order information is sent to the private branch exchange 5a, and subsequently sent to the central management unit 7 via the public telephone network 6. An external data storage device 8 and a printer 9 are connected to the central management unit 7.

Figure 2:
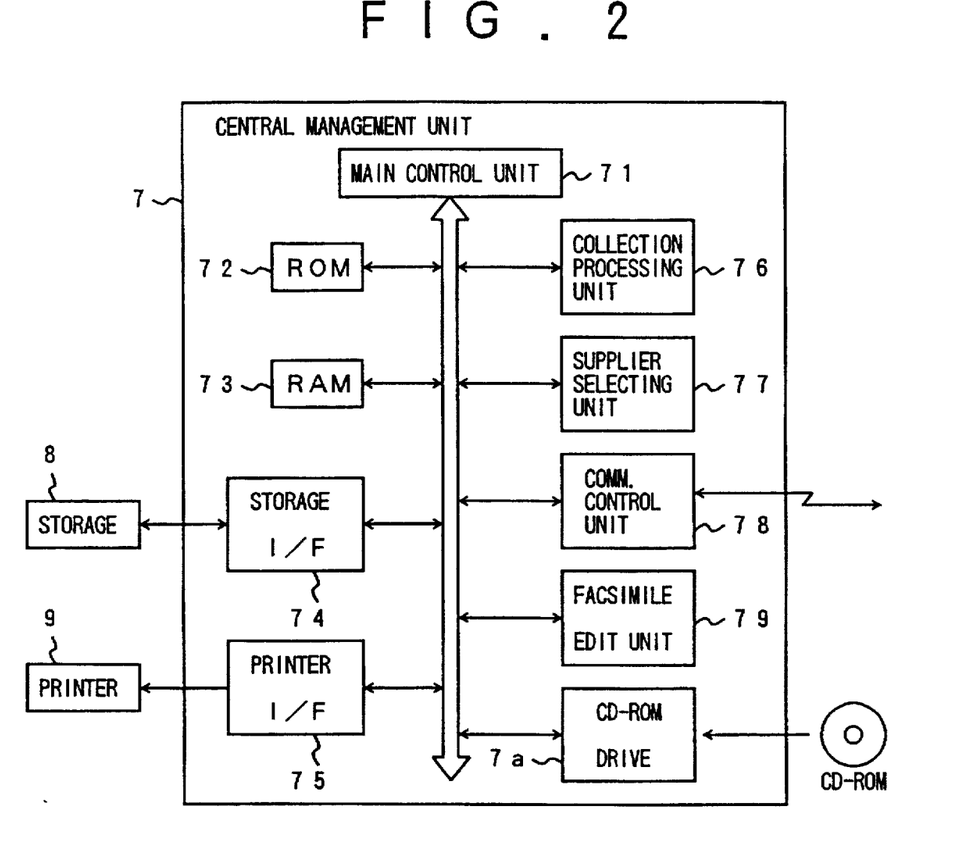
FIG. 2 is a block diagram of a central management unit 7 shown in FIG. 1.

The central management unit 7 receives the order information from the terminal units A to N, and processes the order information to place an order with the supplier. The central management unit 7, which may be a personal computer, comprises, as shown in FIG. 2, a main control unit 71, a read only memory (ROM) 72, a random access memory (RAM) 73, a storage device interface (storage device I/F) 74, a printer interface (printer I/F) 75, a collection processing unit 76, a supplier selecting unit 77, a communication control unit 78, a facsimile edit unit 79 and a CD-ROM drive 7a.

The main control unit 71 controls operations of the entire central management unit 7 based on a system program stored in the ROM 72 or the program information supplied by the CD-ROM drive 7a. The collection processing unit 76 manages order history information and section information stored in the external data storage device 8 for each department or section. The collection processing unit 76 also calculates a momentary sum of the cost of ordered supplies based on the order information supplied from the terminal units A to N. Each of the terminal units A to N may be referred to as "orderer". The collection processing unit 76 outputs order permission information only when the momentary sum of the ordered supplies does not exceed a predetermined budget for each department or section so that an order exceeding the predetermined budget is prevented form being placed. The supplier selecting unit 77 manages supplier information and order history information for each supplier. The supplier selecting unit 77 also calculates a momentary sum of the cost of ordered supplies for each supplier based on the order information supplied from the terminal units A to N. The supplier selecting unit 77 selects one of the supplier whose sum of the cost of ordered supplies will not exceed the predetermined budget for each supplier included in the supplier information stored in the external data storage device 8. This prevents an order from being placed which could cause an excess over the predetermined budget. The facsimile edit unit 79 is provided for editing the order information received from the terminal units A to N to obtain image information for facsimile transmission.

It should be noted that the above-mentioned processes performed by the collection processing unit 76 and the supplier selecting unit 77 may be performed by program information supplied by the ROM 72 or the CD-ROM drive 7a.

Figure 3:
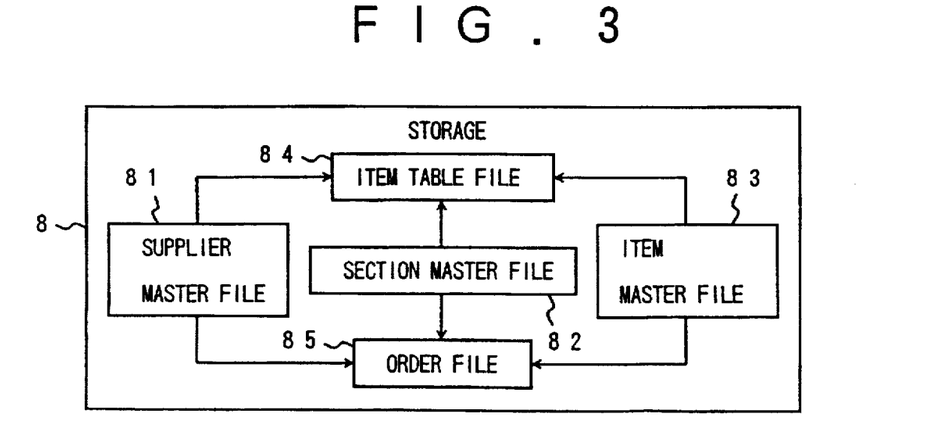
FIG. 3 is an illustration for explaining files stored in an external data storage device shown in FIG. 1.

The external data storage apparatus 8 stores, as shown in FIG. 3, a supplier master file 81, a section master file 82, an item master file 83, an item table file 84 and an order file 85.

Figure 4:
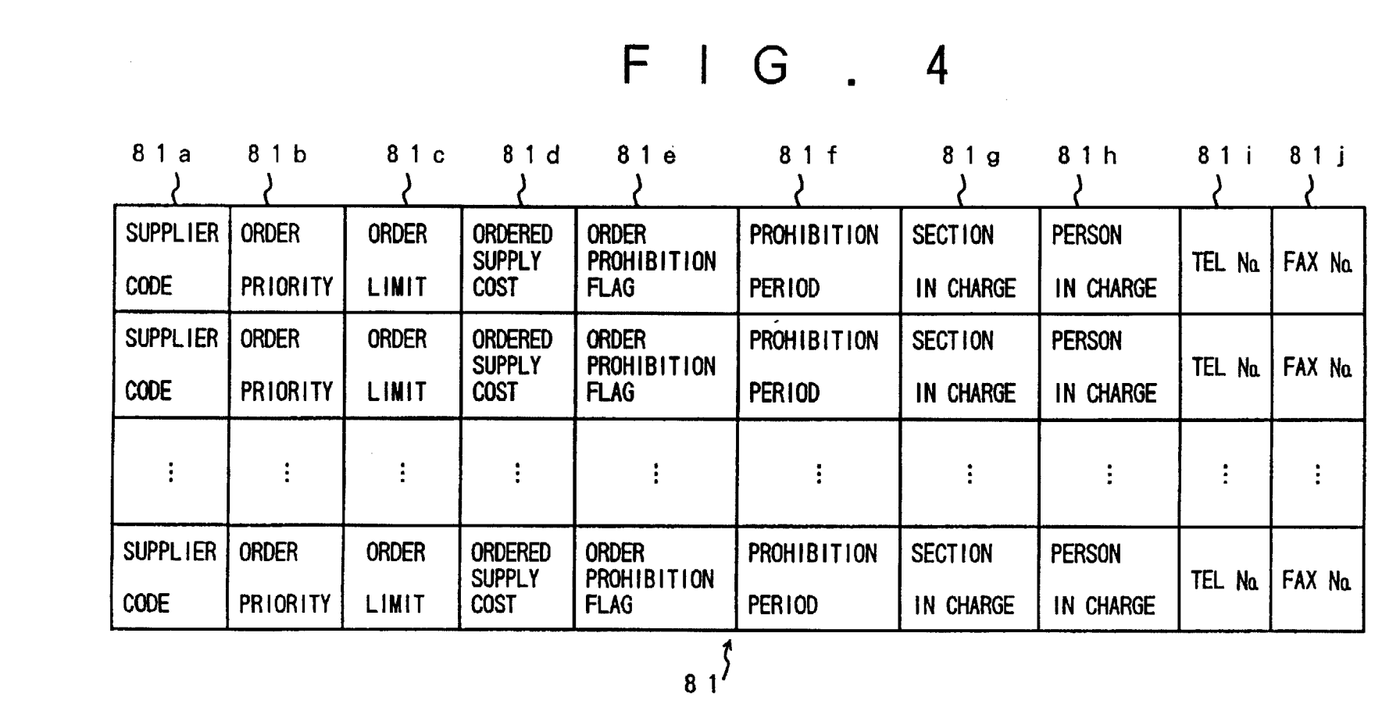
FIG. 4 is an illustration for explaining contents of a supplier master file shown in FIG. 3.

The supplier master file 81 stores the order history information, the supplier information and the supplier management information. This set of information includes, as shown in FIG. 4, a supplier code 81a, an order priority 81b, an order limit 81c, an ordered supply cost 81d, an order prohibition flag 81e, a prohibition period 81f, a section in charge 81g, a person in charge 81h, telephone number 81i and facsimile number 81j. The supplier code 81a is provided to each supplier for identification. The order priority 81b indicates a priority order for placing an order. The order limit 81c indicates the money sum order limit for each supplier. The ordered supply cost 81d indicates a momentary sum of the cost of ordered supplies provided by each supplier. The order prohibition flag 81e indicates that an order is prohibited for a predetermined period. The prohibition period 81f indicates a period for prohibiting an order being placed with each supplier. The section in charge 81g indicates the section in charge of receiving an order at each supplier. The person in charge 81h indicates the name of the person in charge of receiving an order at each supplier. The telephone number 81i indicates the telephone number of each supplier. The facsimile number 81j indicates the facsimile number of each supplier.

Figure 5:
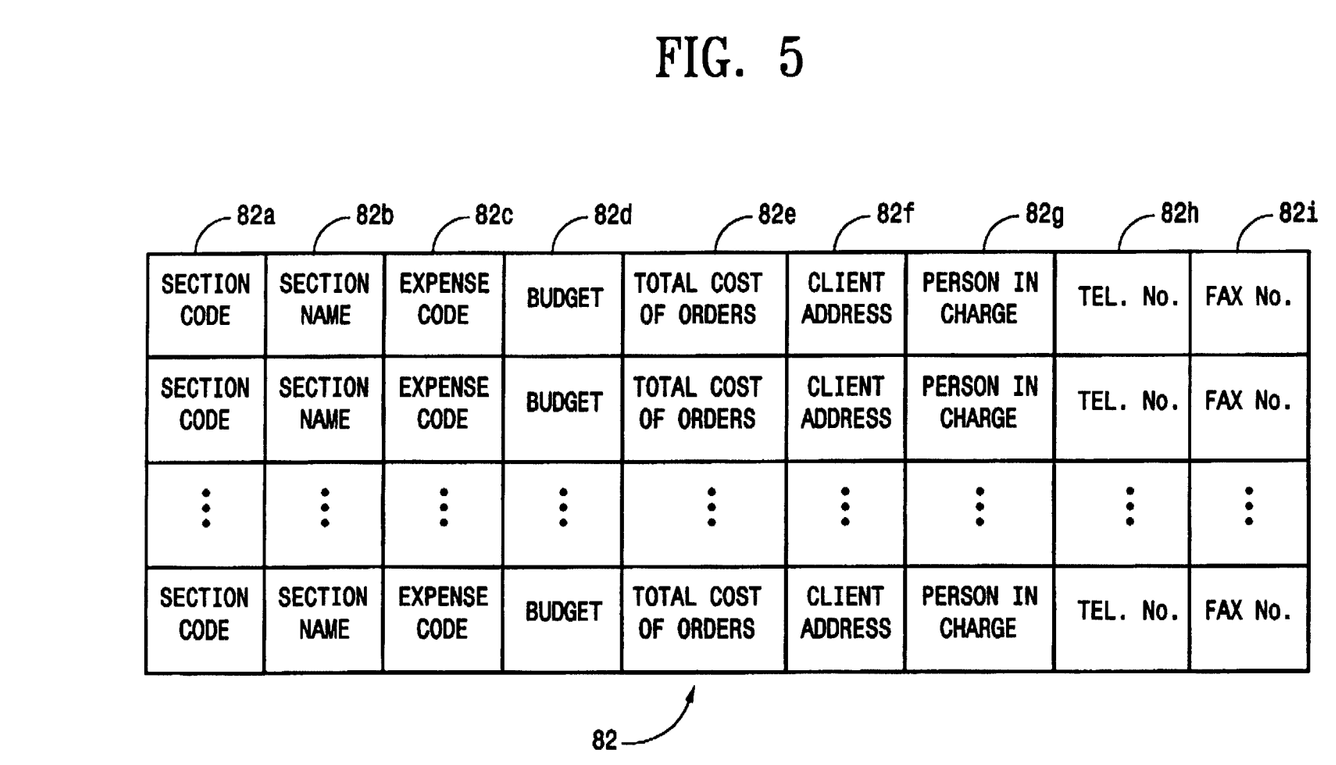
FIG. 5 is an illustration for explaining contents of a section master file shown in FIG. 3.

The section master file 82 stores the section information and the order history information for each department or section. This set of information includes, as shown in FIG. 5, a section code 82a, a section name 82b, an expense code 82c, a budget 82d, a total cost of orders 82e, a client address 82f, a person in charge 82g, a telephone number 82h and a facsimile number 82i. The section code 82a is provided to each department or section for identification. The section name 82b indicates the name of each section which individually places an order. The expense code 82c is a code under which the expense for the ordered item is registered. The budget 82d indicates a budget determined for the current term for each department or section. The total cost of orders 82e indicates a momentary sum of the cost of ordered supplies for each department or section. The client address 82f indicates an address of the orderer. The person in charge 82g indicates the name of the person in charge of each department or section. The telephone number 82h is a telephone number of each department or section which individually places an order. The facsimile number 82i is a facsimile number of each department or section which individually places an order.

Figure 6:
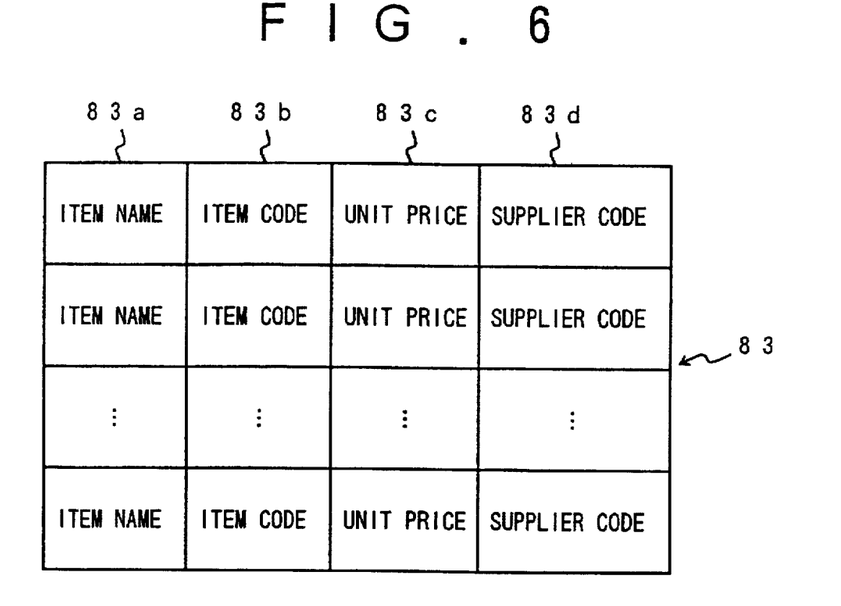
FIG. 6 is an illustration for explaining contents of an item master file shown in FIG. 3.

The item master file 83 stores the item information for the items to be ordered by each department or section. The item information includes, as shown in FIG. 6, item name 83a, supplier item code 83b, a unit price 83c and a supplier code 83d. The item name 83a is the name of each item to be individually ordered by each department or section. The item code 83b indicates a code provided to each item. The unit price 83c indicates the price of each piece of each item. The supplier code 83d indicates a code provided to each supplier handling the item to be ordered. It should be noted that the supplier code 83d of the item master file 83 corresponds to the supplier code 81a of the supplier master file 81.

Figure 7:
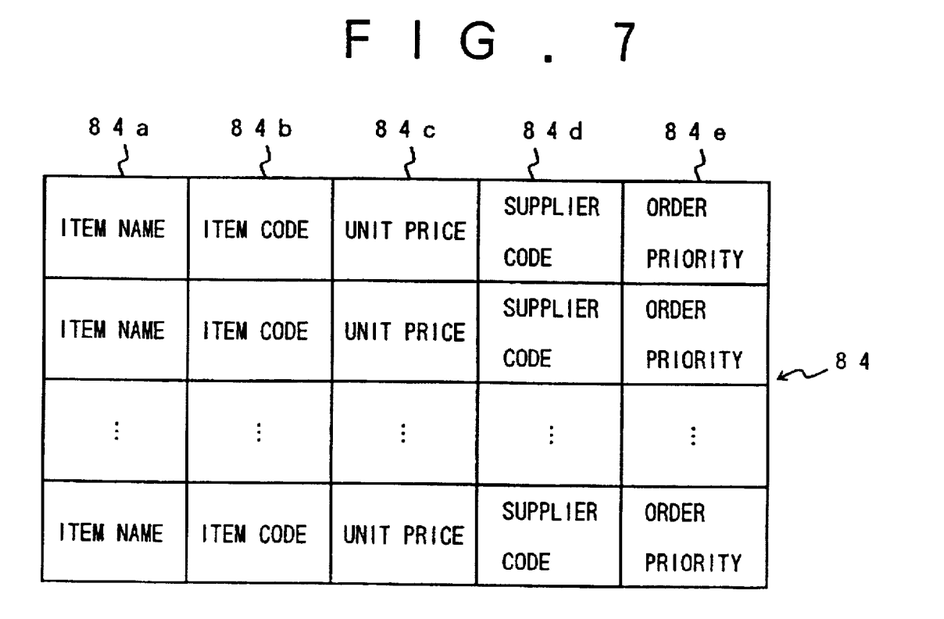
FIG. 7 is an illustration for explaining contents of an item table file shown in FIG. 3.

The item table file 84 is temporarily produced to store table information which is used when an order is placed. The table information includes, as shown in FIG. 7, an item name 84a, a supplier item code 84b, a unit price 84c, a supplier code 84d and an order priority 84e.

Figure 8:
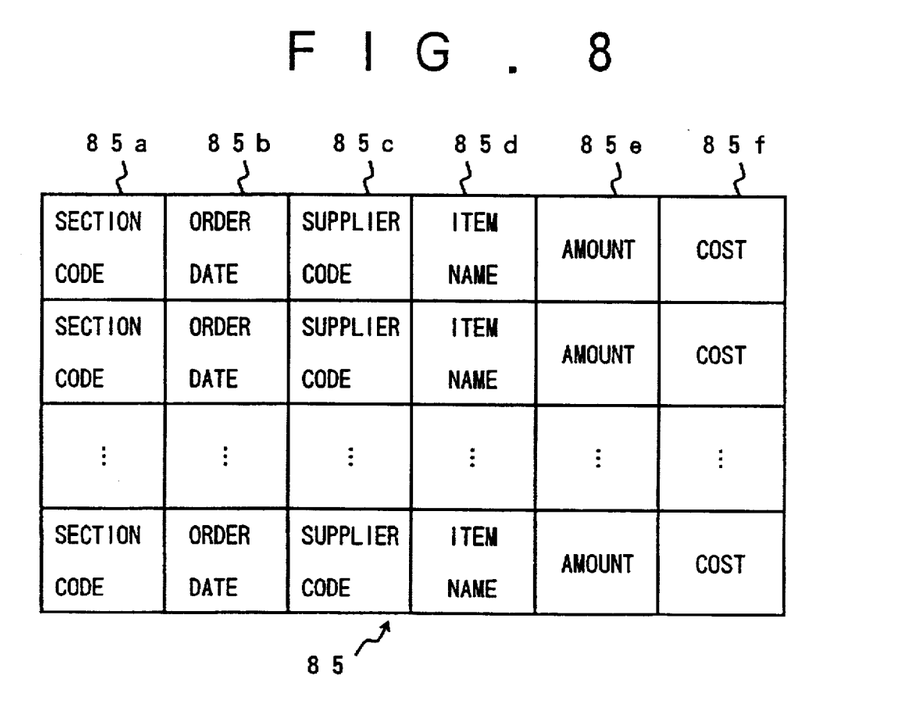
FIG. 8 is an illustration for explaining contents of an order file shown in FIG. 3.

The item file 85 stores the order history information for each department or section or for each supplier. The order history information includes, as shown in FIG. 8, a section code 85a, an order date 85b, a supplier code 85c, an item name 85d, an amount 85e and a cost 85f. The amount 85e indicates an amount of an order. The cost 85f indicates a total cost for the order.

The printer 9 prints the contents of the order file 85 or the section master file 82. The facsimile apparatuses 10a to 10n are located in corresponding supplier's offices so that the order information generated by the central management unit 7 is output in the form of an order sheet or slip.

Figure 9:
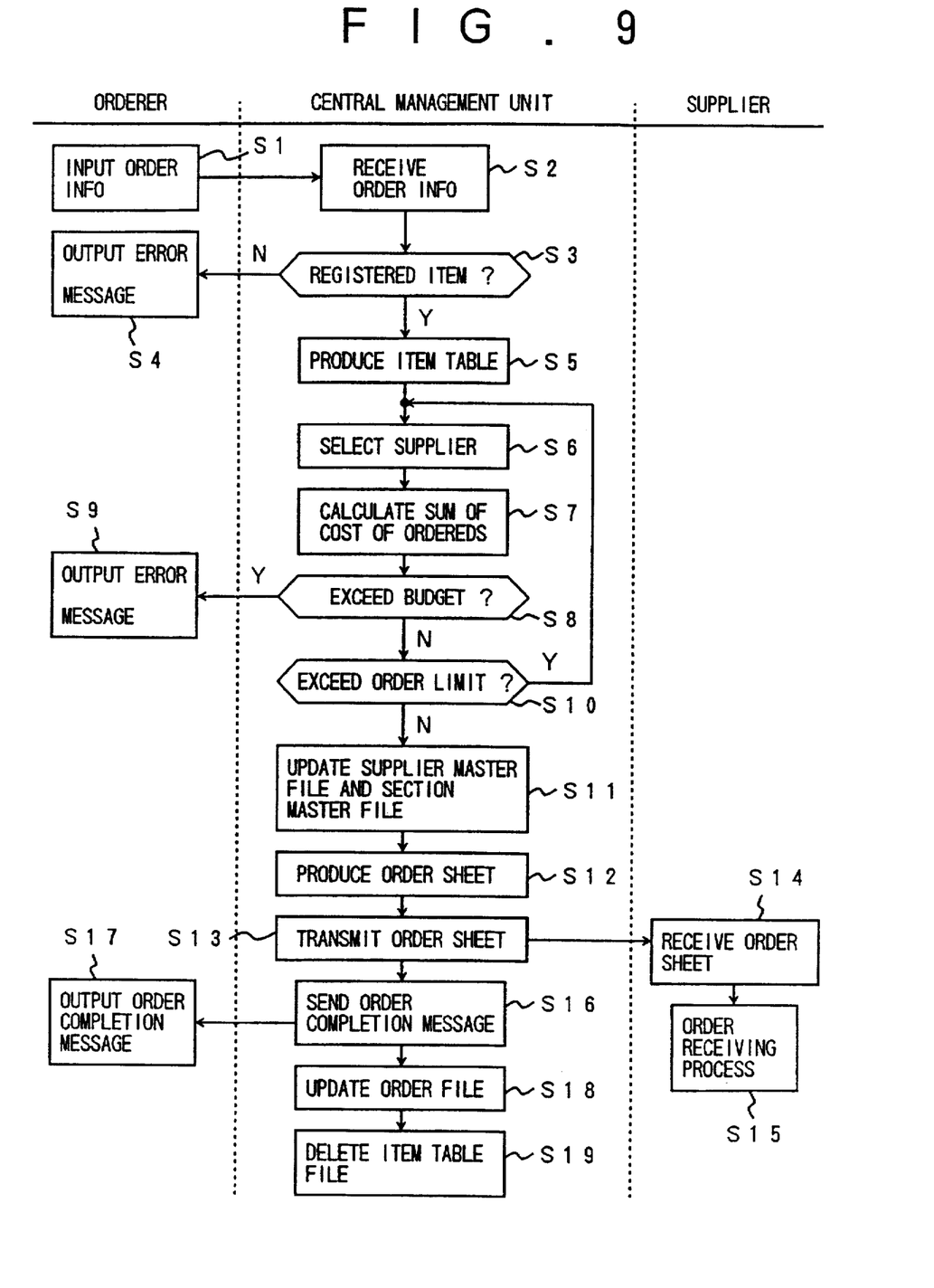
FIG. 9 is a flowchart of an operation of the order management system shown in FIG. 1.

A description will now be given, with reference to a flowchart of FIG. 9, of an operation of the order management system according to the first embodiment of the present invention.

In step S1, the orderer of one of the departments or sections inputs through, for example, the personal computer 1a, information including the section code of their section, an item name to be ordered, an amount and a desired delivery date. The orderer also inputs an order condition as to whether the supplier is selected according to the price priority basis or the supplier priority basis. Then, the personal computer 1a sends the input order information and order condition to the central management unit 7 via the public telephone network 6. The central management unit 7 then receives, in step S2, the order information and the order condition. The central management unit 7 then searches the item master file so as to determine, in step S3, whether or not the item name included in the received order information corresponds to one of the registered item names to which an order can be placed. If it is determined that the item name corresponds to none of the registered item names, the routine proceeds to step S4. In step S4, an error message is sent to the personal computer 1a which indicates that the input item name does not correspond to a registered item which can be ordered.

If it is determined, in step S3, that the input item name corresponds to one of the registered item names, the routine proceeds to step S5. In step S5, the supplier selecting unit 77 compares the input item name with the item name 83a in the item master file 83 to find the item name 83a corresponding to the input item name. When the corresponding item name 83a is found, the item name 83a, the item code 83b, the unit price 83c and the supplier code 83d are read and stored in the item name 84a, the item code 84b, the unit price 84c and the supplier code 84d of the item table file 84, respectively. Additionally, the order priority 81b of the supplier master file 81 is read based on the supplier code 83d, and the order priority is stored in the order priority 84e of the item table file 84 so as to complete the item table file 84. It should be noted that the information corresponding to the supplier having a raised order prohibition flag 81e is skipped.

In step S6, the supplier selecting unit 77 of the central management unit 7 checks the order condition received from the personal computer 1a whether the selection of the supplier should be made according to the price priority basis or the supplier priority basis. If the price priority basis is selected, the item table file is sorted according to a lower price order. If there are more than two suppliers having the same price, they are sorted by the order priority basis. On the other hand, if the supplier priority basis is selected by the order condition input by the personal computer 1a, the item table file 84 is sorted according to the order priority basis.

The collection processing unit 76 of the central management unit 7 reads the unit price 84c of the first row of the item table file 84. The collection processing unit 7 then calculates the order cost by multiplying the read unit price 84c and the amount of order included in the order information. The collection processing unit also calculates a sum of the order costs for the department or section which placed the order at this time by searching the section master file 82 based on the section code of the orderer included in the order information. The calculation is performed by adding the above-mentioned ordered cost at this time to the total cost of orders 82e corresponding to the supplier code 82a. Additionally, the collection processing unit 76 calculates, in step S7, sum of the costs of the ordered supplies to the supplier by adding the cost of the ordered supplies at this time to the ordered supply cost 81d of the corresponding supplier code 81a by searching the supplier master file 81 based on the selected supplier code.

When the summed cost of previously ordered supplies exceeds the budget 82d of the department or section, the collection processing unit 76 sends, in step S8, an error message to the personal computer 1a of the terminal unit A. Then, the personal computer displays, in step S9, the error message, and the routine is ended. Thus, it is prevented that a particular department or section places an order by exceeding its budget. When the summed cost of previously ordered supplies does not exceed the budget 82d of the department or section, the routine proceeds from step S8 to step S10 (described below).

The supplier selecting unit 77 of the central management unit 7 then compares the total cost of ordered supplies with the order limit 81c of the corresponding supplier so as to determine, in step S10, whether or not the cost of ordered supplies exceeds the order limit 81c. If the cost of ordered supplies exceeds the order limit 81c, the routine returns to step S6 so as to repeat steps S6 to S10 so that the next supplier's code is read and costs of the ordered supplies is calculated. Thus, concentrating an excessive amount of orders to a particular supplier is prevented. If the cost of ordered supplies does not exceed the order limit 81c, the routine proceeds from step S10 to step S11 (described below).

The supplier selecting unit 77 updates, in step S11, the supplier master file 81 by substituting the ordered supply cost 81d by the sum of the costs of the ordered supplies for the supplier when the sum of the cost of ordered supplies for the department or section does not exceed the budget 82d for the department or section and when the cost of ordered supplies for the supplier does not exceed the order limit 81c. Additionally, the collection selecting unit 76 updates the section master file 82 by substituting the total cost of the ordered supplies 82e by the sum of the cost of ordered supplies for the department or section. Thereafter, the facsimile edit unit 79 of the central management unit 7 produces, in step S12, image data of an order sheet or slip to be transmitted by facsimile by reading the section name 82b, client address 82f, person in charge 82g, telephone number 82h and the facsimile number 82i. Then, the facsimile edit unit 79 sends, in step S13, the produced image data to the facsimile apparatus 10a, for example, through the public telephone network 6 by reading the facsimile number 81j from the supplier master file 81.

The facsimile apparatus 10a then prints, in step S14, the received image data of the order sheet or slip. In step S15, the supplier performs a receiving process for the order.

After the facsimile transmission of the order sheet or slip is completed, the routine proceeds from step S13 to step S16. In step S16, the main control unit 71 of the central management unit 7 sends an order completion message to the personal computer 1a which is the orderer sheet or slip is completed. Thus, the order completion message is displayed on the personal computer 1a in step S17. Additionally, in step S18, the order file 85 is updated by adding the order record of this time to the order file 85. Then, the contents of the item table file 84 is deleted, in step S19, to prepare for receiving the next order information.

Figure 10:
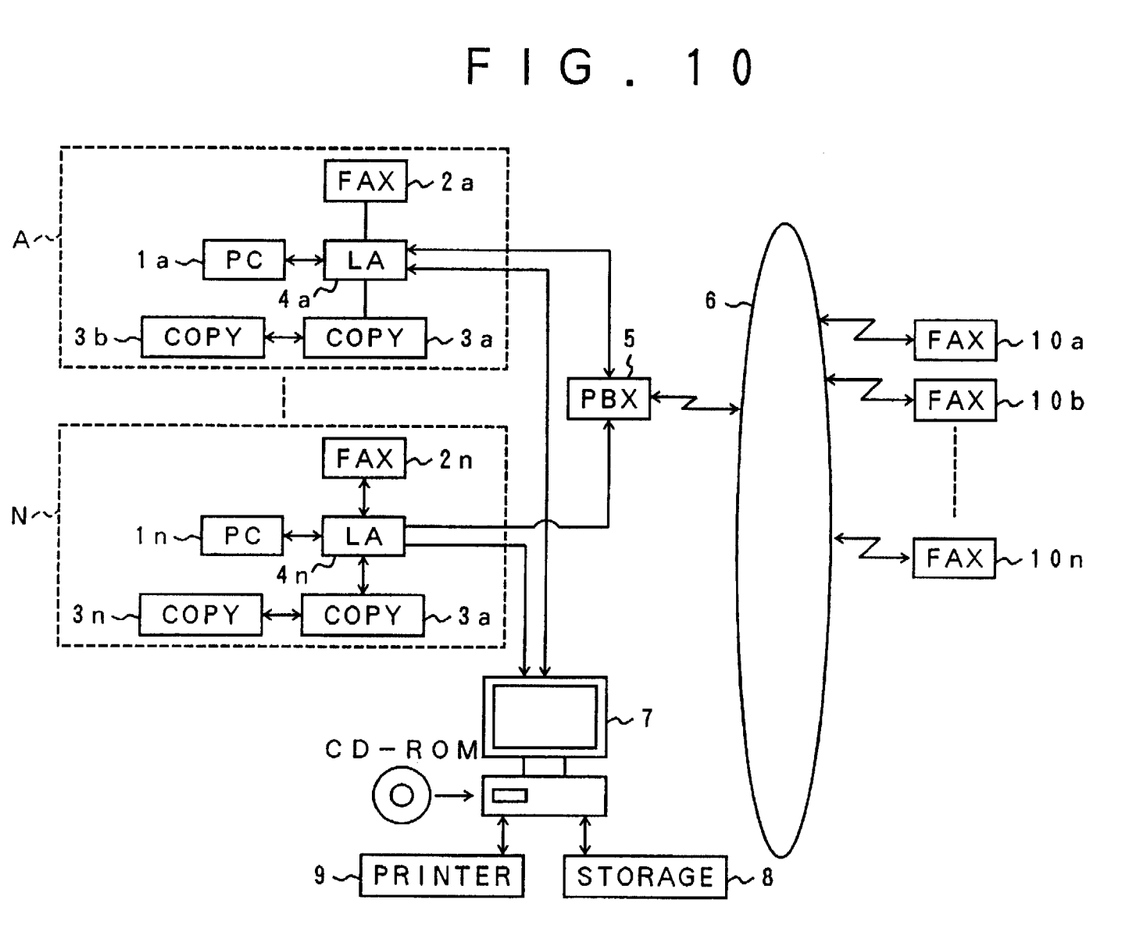
FIG. 10 is a structure diagram of an order management system according to a second embodiment of the present invention.

A description will now be given, with reference to FIG. 10, of a second embodiment of the present invention. FIG. 10 is a structure diagram of an order management system according to the second embodiment of the present invention. In FIG. 10, parts that are the same as the parts shown in FIG. 1 are given the same reference numerals, and descriptions thereof will be omitted.

The second embodiment is characterized in that the terminal units A to N and the central management unit 7 are located in the same building or site. That is, in the second embodiment, the terminal units A to N are located in departments or sections in the same building or site, and the line adapter of each of the terminal units A to N is directly connected to the central management unit 7 which is also located in the same building or site.

In the above-mentioned first and second embodiments, the order priority 81b is fixed. However, the priority order may be changed by setting the most recently ordered supplier with the lowest order priority so that an order is sequentially placed to all suppliers. This sequential order will prevent concentration of orders into a particular supplier.

Alternatively, the selected supplier may be selected from the supplier which has the lowest cost of ordered supplies by searching the ordered supply cost 81d of the supplier master file 81. This may also prevent a concentration of orders into a particular supplier.

Additionally, in the above-mentioned first and second embodiments, the total cost of orders 82e is recorded immediately after the order is placed so that the total cost of orders 82e can be searched any time. However, the total cost of the ordered supplies may be calculated based on the order file 85.

Further, in the above-mentioned embodiments, the order information is output to the facsimile apparatus 10a to 10n which are located in the supplier's office. However, the ordered sheet or slip may be output from the printer 9, and may be sent by mail from the department or section to the suppliers.

Further, although the ordering process in the above-mentioned embodiments is described as to be performed by separate units such as the main control unit 71, the collection processing unit 76 and the supplier selecting unit, the ordering process may be performed by a processing unit such as the main control unit 71 in cooperation with program information supplied by the CD-ROM drive 7a using a CD-ROM storing the program information, or by program information stored in a memory such as the ROM 72.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structure.

The present invention is not limited to the specifically disclosed embodiments, and variations and modifications may be made without departing from the scope of the present invention.

What is claimed is:

1. An order management method for automatically placing an order with one of a plurality of suppliers when order information is input by one of a plurality of orderers, said order management method being performed in an order management system comprising a plurality of terminal units provided to the respective orderers and a central management unit connected to each of said terminal unit, said order management method comprising the steps of:

sending the order information from one said terminal units to said central management unit;

calculating a total cost of previous orders based on order history information of one of the orderers sending the order information and order information sent from the one of orderers by managing the order history information and section information with respect to each of said orderers;

permitting an execution of an ordering process when the calculated total cost of previous orders is within a budget of the orderer, the budget being included in the section information;

calculating a total cost of previously received orders for each of said suppliers based on the order history information and the order information; and selecting one of the suppliers whose calculated total of previously received orders is within an order limit.

2. The order management method as claimed in claim 1, further comprising the step of:

selecting said one of said suppliers based on the order history information so that each of the suppliers equally receives orders.

3. The order management method as claimed in claim 1, further comprising the step of:

prohibiting an order to be placed with a supplier indicated by an order prohibition flag included in supplier information.

4. The order management method as claimed in claim 1, further comprising the step of:

selecting one of said suppliers offering the lowest price when an item to be ordered is supplied by a plurality of suppliers.

5. The order management method as claimed in claim 1, further comprising the step of:

automatically requesting an order with said suppliers based on the order information through a communication network connecting said central management unit to each of said suppliers.

6. A processor readable medium storing program code for causing a computer to automatically place an order with one of a plurality of suppliers when order information is input by one of a plurality of orderers, a terminal unit being provided to each of said orderers and a central management unit being connected to each of said terminal units, said processor readable medium comprising:

first program code means for receiving the order information from one of said terminal units;

second program code means for calculating a total cost of previous orders based on order history information of one of the orderers sending the order information and order information sent from said one of orderers by managing the order history information and section information with respect to each orderer;

third program code means for permitting an execution of an ordering process when the calculated total cost of previous orders is within a budget of the orderer, the budget being included in the section information;

fourth program code means for calculating a total cost of previously received orders for each of said suppliers based on the order history information and the order information; and fifth program code means for selecting one of the suppliers whose calculated total cost of previously received orders is within an order limit.

7. The processor readable medium as claimed in claim 6, further comprising:

program code means for automatically placing an order with said suppliers based on the order information through a communication network connecting said central management unit to said terminal unit.

8. The processor readable medium as claimed in claim 6, further comprising:

program code means for prohibiting execution of an order to be placed with said supplier indicated by an order prohibition flag included in supplier information.

9. The processor readable medium as claimed in claim 6, further comprising:

program code means for selecting one of said suppliers offering the lowest price when an item to be ordered is supplied by a plurality of said suppliers.

10. A computer specially configured by executing program code stored on a computer-usable media for causing an order to be automatically placed with one of a plurality of suppliers when order information is input by one of a plurality or orderers, a terminal unit being provided to each of said orderers so as to input the order information to said computer, the program code including:

first program code means for receiving the order information from said terminal unit of one of said orderers;

second program code means for calculating a total cost of previous orders based on order history information of one of said orderers sending the order information and order information sent from said one of said orderers by managing the order history information and section information with respect to each of said orderers; and third program code means for permitting an execution of an ordering process when the calculated total cost of previous orders is within a budget of the orderer, the budget being included in the section information;

fourth program code means for calculating a total cost of previously received orders for each of said suppliers based on the order history information and the order information; and fifth program code means for selecting one of the suppliers whose calculated total of previously received orders is within an order limit.

11. The computer as claimed in claim 10, wherein the program code further includes:

program code means for automatically placing an order with said suppliers based on the order information through a communication network connecting said central management unit to said terminal units of each of said orderers.

12. The computer as claimed in claim 10, wherein the program code further includes:

program code means for prohibiting an order to be placed with a supplier indicated by an order prohibition flag included in supplier information.

13. The computer as claimed in claim 10, wherein the program code further includes:

program code means for selecting one of said suppliers offering the lowest price when an item to be ordered is supplied by a plurality of said suppliers.

14. A computer implemented method for causing an order to be automatically placed with one of a plurality of suppliers when order information is input by one of a plurality of orderers, a terminal unit being provided to each of said orderers so as to input the order information to said computer, the computer-implemented method comprising the steps of:

receiving the order information from one of said terminal units;

calculating a total cost of previous orders based on order history information of one of the orderers sending the order information and order information sent from the one of the orderers by managing the order history information and section information with respect to each of said orderers; and permitting execution of an ordering process when the calculated total cost of previous orders is within a budget of the orderer, the budget being included in the section information;

calculating a total cost of previously received orders for each of said suppliers based on the order history information and the order information; and selecting one of the suppliers whose calculated total cost of previously received orders is within an order limit.

15. The computer-implemented method as claimed in claim 14, further comprising the step of:

automatically requesting an order with said suppliers based on the order information through a communication network connecting said central management unit to said terminal unit of each of said orderers.

16. The computer-implemented method as claimed in claim 14, further comprising the step of:

prohibiting an order to be placed with a supplier indicated by an order prohibition flag included in supplier information.

17. The computer-implemented method as claimed in claim 14, further comprising the step of:

selecting one of said suppliers offering the lowest price when an item to be ordered is supplied by a plurality of said suppliers.

18. An order management system for automatically placing an order with one of a plurality of suppliers when order information is input by one of a plurality of orderers, said order management system comprising:

a terminal unit provided to each of said orderers, said terminal unit being arranged to input the order information, the order information being transmitted to a communication network; and a central management unit receiving the order information from said terminal unit through said communication network, said central management unit including a collection processor for managing order history information and section information with respect to each orderer, said collection processor calculating a total cost of the previous orders based on the order history information of one of the orderers sending the order information and order information sent from said one of said orderers, said central management unit also including an order permission system for permitting execution of an ordering process when calculated total costs of the previous orders is within a budget of the orderer, the budget being included in the section information; and wherein said central management unit further includes a supplier selecting system for calculating a total cost of previously received orders for each of said suppliers based on the order history information and the order information, and for selecting one of said suppliers whose total cost of previously received orders is within an order limit.

19. The order management system as claimed in claim 18, wherein said supplier selecting system selects one of said suppliers based on the order history information so that each of said suppliers equally receives orders.

20. The order management system as claimed in claim 18, wherein said supplier selecting system manages supplier information including an order prohibition flag which represents prohibition of placing an order with a supplier indicated by the order prohibition flag.

21. The order management system as claimed in claim 18, wherein said supplier selecting system selects one of said suppliers offering the lowest price when an item to be ordered is supplied by a plurality of suppliers.

22. The order management system as claimed in claim 18, wherein said order management system is arranged to place an order through said communication network with said suppliers based on the order information.

* * * * *